United States Patent [19]

Hiroki et al.

[11] Patent Number: 4,945,424
[45] Date of Patent: Jul. 31, 1990

[54] POWER SWITCHING ARRANGEMENT FOR VIDEO CAMERA APPARATUS

[75] Inventors: Keiichiro Hiroki, Tachikawa; Yukihiko Fukasawa, Kawasaki; Ken Yamauchi, Tokyo, all of Japan

[73] Assignee: Casio Computer Co., Ltd., Tokyo, Japan

[21] Appl. No.: 305,282

[22] Filed: Feb. 1, 1989

[30] Foreign Application Priority Data

Feb. 10, 1988 [JP] Japan .............................. 63-16898[U]

[51] Int. Cl.$^5$ .............................................. H04N 5/76
[52] U.S. Cl. .................................... 358/335; 358/209; 358/224; 358/906
[58] Field of Search ............... 358/906, 224, 335, 181, 358/909, 209; 360/33.1

[56] References Cited

U.S. PATENT DOCUMENTS

| | | | |
|---|---|---|---|
| 4,396,941 | 8/1983 | Nishimura et al. | 358/93 |
| 4,400,743 | 8/1983 | Takimoto et al. | 358/906 |
| 4,581,644 | 4/1986 | Deiss | 358/181 |
| 4,731,677 | 3/1988 | Mino et al. | 358/906 |
| 4,740,828 | 4/1988 | Kinoshita | 358/224 |
| 4,755,885 | 7/1988 | Okino et al. | 358/906 |
| 4,758,905 | 7/1988 | Okada et al. | 358/906 |
| 4,858,028 | 9/1989 | Okino | 368/335 |

FOREIGN PATENT DOCUMENTS 61-67372  4/1986 Japan .
61-103968 7/1986 Japan .
61-150474 7/1986 Japan .

Primary Examiner—Robert L. Richardson
Attorney, Agent, or Firm—Frishauf, Holtz, Goodman & Woodward

[57] ABSTRACT

Video camera apparatus includes image pick-up equipment, video recording and/or reproducing apparatus, display equipment, and an electronic view finder. In the apparatus, independent power on-off switches are provided in the image pick-up equipment and the video recording and/or reproducing equipment, respectively, and a selecting switch is provided for selecting a television tuner or an external input, and an input of the video recording and/or reproducing equipment. Switching on-off (operation-turn off) of the display equipment or the electronic view finder is automatically controlled in accordance with operation of these switches.

15 Claims, 8 Drawing Sheets

POWER SWITCHING ARRANGEMENT FOR VIDEO CAMERA APPARATUS

BACKGROUND OF THE INVENTION

The present invention relates to an electronic apparatus provided with an image pick-up equipment, a video recording and/or reproducing equipment, and a display equipment.

Recently, video cameras for home use have been popularized. Some of those video cameras are designed for the exclusive use for video recording but in general video cameras for home use are equipped with a video recording and reproducing function. There have been proposed some other video cameras integrally provided with a display device for a monitoring purpose in addition to the function mentioned above. Namely, the video camera is provided with a display device having a picture screen of approximately 3 inches in place of a conventional electronic view finder having a relatively narrow picture screen, and permitting usage as a view finder or a monitor for reproduction. Other video camera has been proposed, which contains a television tuner in addition to the devices or the functions mentioned above and displays video signals received by the television tuner on the above mentioned display device.

However, the video camera equipped with a number of functions as described above can be used in various ways, resulting in an extreme complexity in its manipulation. For example, it is possible in the above video camera to select a reproduced video signal of the camera or a received video signal from the television tuner for displaying on the display device, or it is possible to turn off the display device, as the electronic view finder works during recording of pictures. There has been a disadvantage that it is extremely troublesome for a user of the video camera to select a required function out of these functions by manipulating the switch. Furthermore, there has been another disadvantage that the complexity in manipulation often leaves a switch turned ON for an unwanted function, resulting in unnecessary power consumption.

The technique of combining a video camera with a television receiver and a liquid crystal display device is disclosed in the following prior art: Japanese Patent Disclosure Nos. Sho 61-67372, Sho 61-150474 and Japanese Device Patent Disclosure No. Sho 61-103968. However none of the prior art discloses a relationship between a power source circuit and a switching means for turning on and/or off each portion in the apparatus. Meanwhile, the applicant of the present patent application filed a patent application Ser. No. 185,491 in the U.S. Patent Office, the invention described in which application relates to an electronic still camera provided with a liquid crystal display monitor. This application describes an apparatus in which a picture taken by means of the electronic still camera is transferred to a video tape recorder connected thereto for magnetically recording on a magnetic tape and is displayed on a monitoring device.

The video camera apparatus according to the present invention comprises not only a simple combination of a video camera, a television receiver, a video recording and reproducing equipment and a liquid crystal display device but also a functional coupling of various functions for easy manipulation and novel usage.

SUMMARY OF THE INVENTION

The present invention has been made to overcome those disadvantages of the prior art mentioned above. The object of the present invention is to provide an electronic apparatus equipped with an image pick-up equipment, a video recording and/or reproducing equipment and a display equipment, in which only required functions for conditions of its usage of the electronic apparatus are automatically turned on and unnecessary functions are automatically turned off, and the remaining functions are manually turned on or turned off by the user, thereby permitting an easy operation and saving power consumption.

In order to accomplish the above and other objects, the electronic apparatus according to the present invention is constructed as described as follows: a video camera apparatus having an image pick up equipment with an electronic view finder, a video recording and/or reproducing equipment with a television tuner, and a display equipment, the apparatus comprising: a first on-off switch provided on said image pick-up equipment; a second on-off switch provided on said video recording and/or reproducing equipment; a third on-off switch provided on said display equipment; a selecting switch for selecting a television tuner or an external input; means for causing said electronic view finder to operate and said display equipment to turn off, when said first on-off switch is turned on and said second on-off switch is turned off; means for causing said electronic view finder to turn off, when said first on-off switch is turned off and said second on-off switch is turned on and for causing said display equipment to operate, when said television tuner is selected by said selecting switch, and for causing said display equipment to operate or turn off in dependance on a manipulation of said third switch, when said external input is selected by said selecting switch; and means for causing said electronic view finder to operate when said first and second on-off switches are turned on, and for causing said display equipment to operate when said television tuner is selected by said selecting switch, and for causing said display equipment to operate or turn off in dependance on a manipulation of said third switch, when said external input is selected by said selecting switch.

In the electronic apparatus, constructed as described above, equipped with the image pick-up equipment, the video recording and/or reproducing equipment and the display device, an independent power ON/OFF switch is provided in the television camera equipment and the video recording and reproducing apparatus, respectively and a selecting switch is provided for selecting a signal from the tuner or an external input signal to supply an input signal to the video recording and reproducing equipment, and the display device and the electronic view finder are automatically turned on or turned off in accordance with a manipulated state of these switches, so that only required functions are automatically turned on in accordance with using conditions of the electronic apparatus itself, and functions not required are automatically turned off in the same manner and the remaining functions are manually turned on or turned off by the user, thereby resulting in a simple manipulation and permitting saving of power consumption.

BRIEF DESCRIPTION OF THE DRAWINGS

FIG. 6 is a block diagram showing a power source system with a camera switch being off, a VTR switch being turned on, an external input being selected by a selecting switch, and a monitor switch being turned on;

FIG. 7 is a block diagram showing a power source system with a camera switch being turned on, a VTR switch being turned on, an external input being selected by a selecting switch, and a monitor switch being turned on.

DETAILED DESCRIPTION OF THE EMBODIMENTS

A preferred embodiment of the present invention will be described referring to the accompanying drawings.

Figure 1:
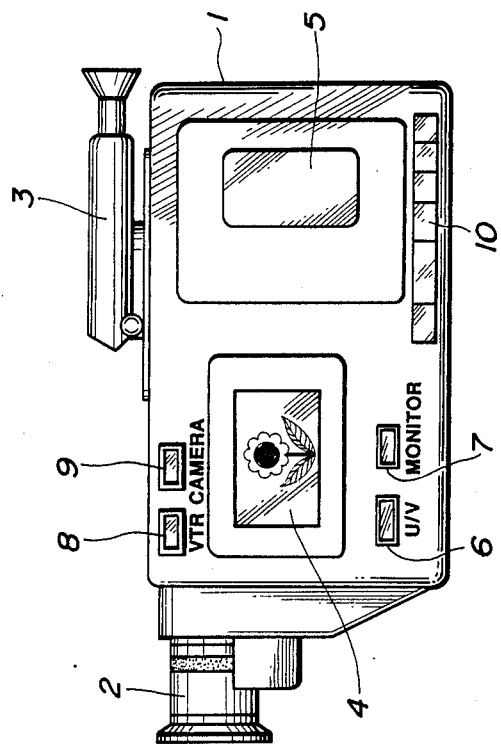
FIG. 1 is a view illustrating an external construction of a preferred embodiment of the present invention.
Figure 1:
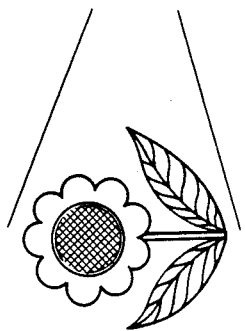

FIG. 1 is a view showing an external construction of an embodiment. In FIG. 1, numeral 1 denotes an apparatus body, 2 is a camera lens, 3 is an electronic view finder (hereinafter, referred to as "EVF"), 4 is a monitor display section, 5 is a video tape recorder section (hereinafter, referred to as "VTR section"), 6 is a selecting switch for selecting an external input and frequency bands of UHF/VHF of a television tuner enclosed in the apparatus 1 (not shown), 7 is a monitor switch for turning on or off a power source of the monitor display section 4, 8 is a VTR switch for turning on or off a power source of the VTR section 5, 9 is a camera switch for turning on or off camera operation, and 10 is a VTR operation switch for setting modes such as RECORDING/REPRODUCING/FAST FORWARD/REWIND/STOP modes of the VTR section 5. The monitor display section 4 comprises a color liquid-crystal display-device of a dot-matrix type having, for example, a height of 120 dots and a width of 160×3 dots, because this display device works with relatively low power consumption and can be made relatively thin in its size. The monitor display section 4 has a back light involved in its rear board and this back light is kept on while pictures are displayed on the monitor display.

Figure 2:
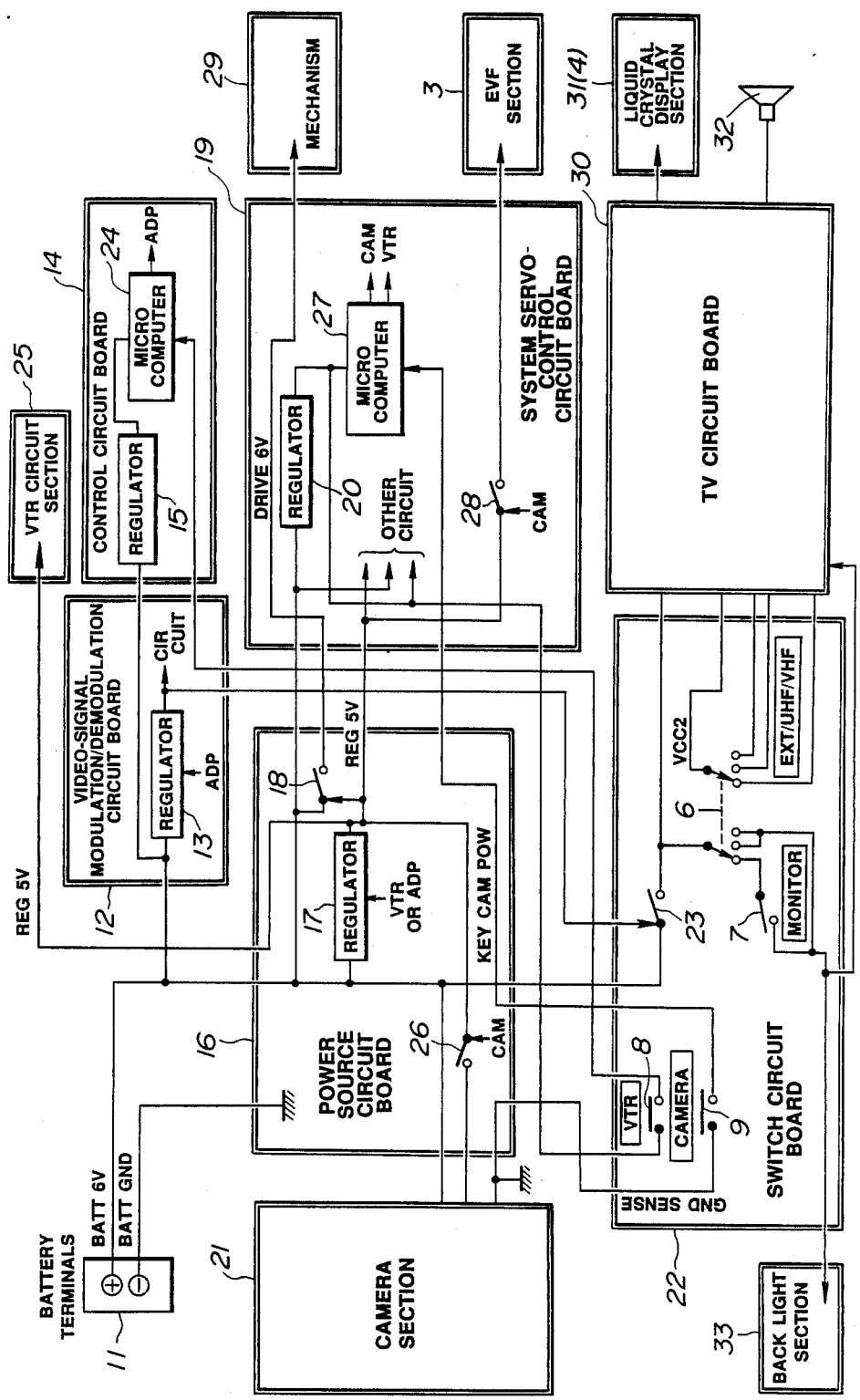
FIG. 2 is a block diagram showing a power source system arrangement of the embodiment of the invention.

FIG. 2 is a view illustrating a circuit arrangement of a power source system involved in the apparatus body mentioned above. In FIG. 2, numeral 11 denote terminals of a battery serving as a power source. A power voltage of approximate 6 (V) is applied through a positive terminal of the battery terminals 11 to each part of various circuits in the electronic apparatus, such as a regulator 11 of a video-signal modulation/demodulation circuit-board 12, a regulator 15 of a control circuit board 14, a regulator 17 and a switch 18 of a power-source circuit-board 16, a regulator 20 and other circuits of a system servo-control circuit-board 19, a camera section 21, and a switch 23 of a switch circuit-board 22. All of the selecting switch 6, the monitor switch 7, the VTR switch 8, and camera switch 9 are connected to the switch circuit-board mentioned above. While, a negative terminal of the battery terminals 11 is grounded on the power-source circuit-board 16. The regulator 15 of the control circuit-board 14 regulates the applied power voltage of 6 (V) to a voltage of 5 (V) and applies the regulated voltage of 5 (V) to a micro-computer 24. The micro-computer 24 serves to control the whole system of the electronic apparatus, and supplies an adapter control signal ADP to the regulator 13 of the video-signal modulation/demodulation circuit-board 12 and the regulator 17 of the power-source circuit-board 16. The adapter control signal ADP is used to execute ON/OFF control of the power source of the circuits of the video tape recorder. Namely, the adapter control signal ADP executes ON/OFF control of the power source of circuits to be operated in a playback mode or in a recording mode in which video signals from a television circuit or a line input are recorded. The regulator 13 of the video-signal modulation/demodulation circuit board 12 regulates the applied power voltage of 6 (V) to a voltage of 5 (V) and applies the regulated voltage of 5 (V) to circuits for modulating and demodulating video signals mounted on the video-signal modulation/demodulation circuit-board 12 and also sends the regulated voltage as an open/close control-signal to the switch 23 of the switch circuit-board 22. The regulator 17 of the power-source circuit-board 16 regulates the power voltage of 6 (V) applied through the battery terminals 11 to a voltage of 5 (V) and applies the regulated voltage of 5 (V) to circuits 25 of the video tape recorder and also supplies the regulated voltage as an open/close control-signal to the switch 18 of the power-source circuit-board 16. Furthermore, the regulator 17 of the power-source circuit-board 16 applies the regulated voltage to the other circuits of the system servo-control circuit-board 19 and also applies the regulated voltage as an open/close control signal to the switch 26 of the power-source circuit-board. The regulator 20 of the system servo-control circuit-board 19 regulates the power voltage of 6 (V) to a voltage of 5 (V) and applies the regulated voltage to a micro-computer 27 and the other circuit of the circuit-board 29 and also to one terminal of the VTR switch 8. Other terminal of the VTR switch 8 is connected to the micro-computer 24 of the control circuit-board 14. Said micro-computer 27 of the system servo-control circuit-board 19 serves to control mechanisms of the VTR section 5, and outputs a camera control signal CAM as an open/close control signal to the switch 26 of the power-source circuit-board 16 and a switch 28 of the system servo-control circuit-board and also outputs a video control signal VTR as an operation signal to the regulator 17 of the power-source circuit-board 16. The video-control signal VTR serves to execute ON/OFF control of the power source to the mechanisms of the video tape recorder. Namely, this signal serves for controlling ON/OFF of the power source to the mechanisms to be operated during image pick-up operation and also during recording and/or reproducing operation of the video tape recorder. A stationary terminal of the switch 26 is connected to the camera section 21 and therefore the output voltage of the regulator 17 is applied to the camera section 21 through the switch 26, open and/or closure of which is controlled by the camera control signal CAM. The switch 18 of the power-source circuit-board is controlled its open and/or closure by the output voltage of the regulator 17 and transfers the power voltage of 6 (V) from the battery terminal 11 to mechanisms 29. The camera switch 9 mounted on the switch circuit board 22 is connected to the camera section 21 with its one terminal being grounded and the other terminal being connected to the micro-computer 27 of the system servo-control circuit-board 19 through the power-source circuit-board 16. The switch 28 of the system control circuit-board 19 is controlled in its open and/or closure by the camera control signal CAM supplied from the micro-computer 27 and applies the output voltage of 5 (V) from the regulator 17 to EVF 3. The stationary terminal of the switch 23 of the switch circuit-board 22 is coupled to a TV circuit-board 30 and also coupled to a movable terminal of the selecting switch 6 which consists of two circuits and three contact points. The selecting switch 6 serves to transfer the power voltage of the battery terminals 11. The TV circuit board 30, provided with a circuit for displaying television pictures on the monitor display section 4, supplies video signals to a liquid crystal display section 31, i.e., the monitor display section 4 to display television pictures and supplies audio signals to a speaker 32. The TV circuit board 30 applies a voltage VCC2 to the other movable terminal of the selecting switch 6 of the switch circuit-board 22. Three stationary terminals corresponding to the other movable terminals of the switch 6 correspond to "EXT" (external input), "UHF" (television broadcasing), and "VHF" (television broadcasting) terminals. The stationary terminal corresponding to the movable terminal associated with the above mentioned movable terminal of the selecting switch 6 consists of three contact points, one contact point being connected to the TV circuit board 30 and a back light section 33 through the monitor switch 7, and the remaining two contact points being directly connected to the TV circuit board 30 and the back light section 33,, thereby applying the power voltage of 6 (V) of the battery terminals 11. Accordingly, when the external input is selected by the selecting switch 6, the power voltage is supplied to the TV circuit-board 30 and the back light section 33 by manipulation of the monitor switch 7, and when the television broadcasting of UHF or VHF is selected by the selecting switch 6, the power voltage is supplied to the TV circuit board 30 and the back light section 33 to cause these sections to operate regardless of the manipulation of the monitor switch 7.

Figure 3:
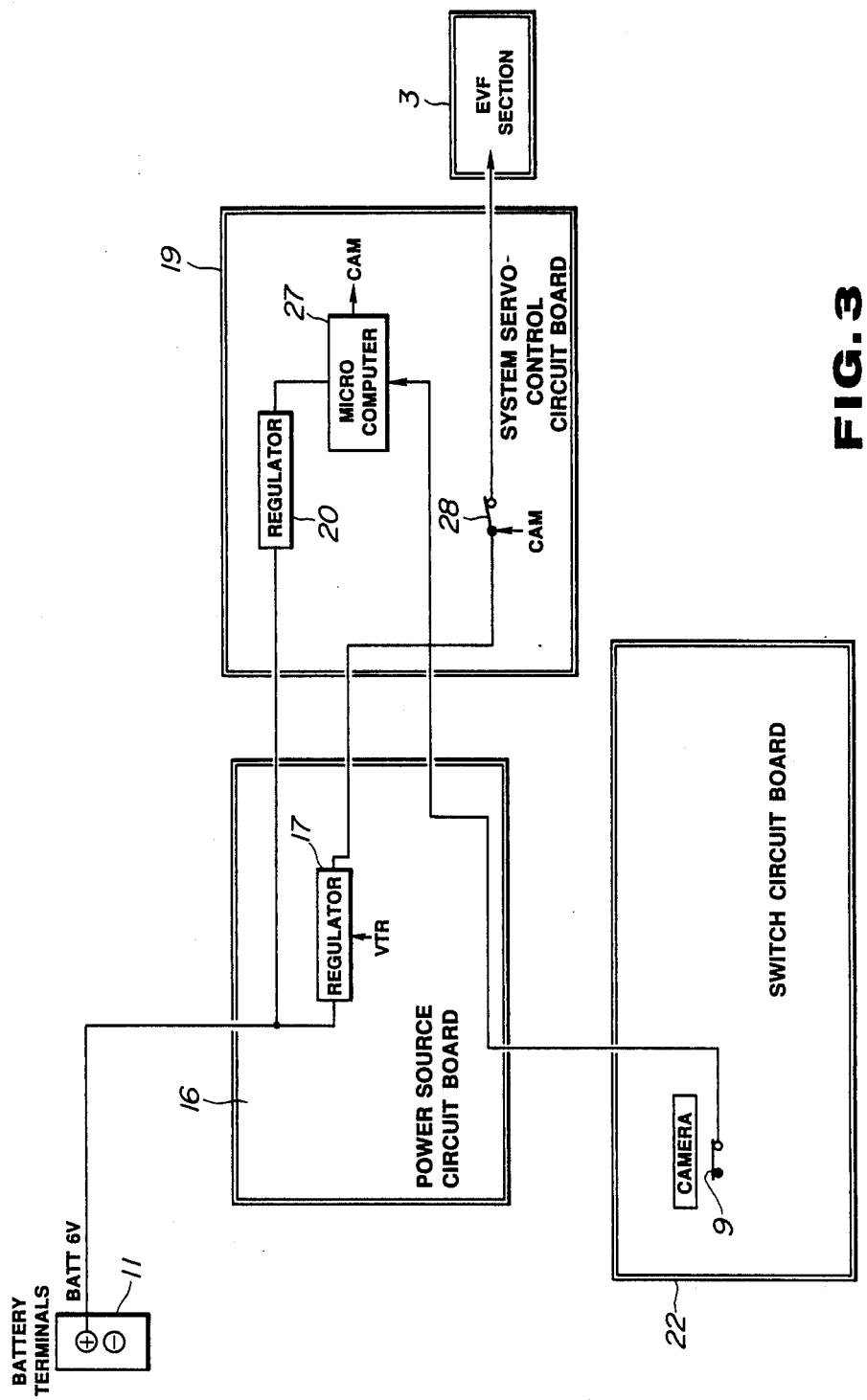
FIG. 3 is a block diagram showing a power source system with a camera switch being turned on and a VTR switch being turned off.
Figure 4:
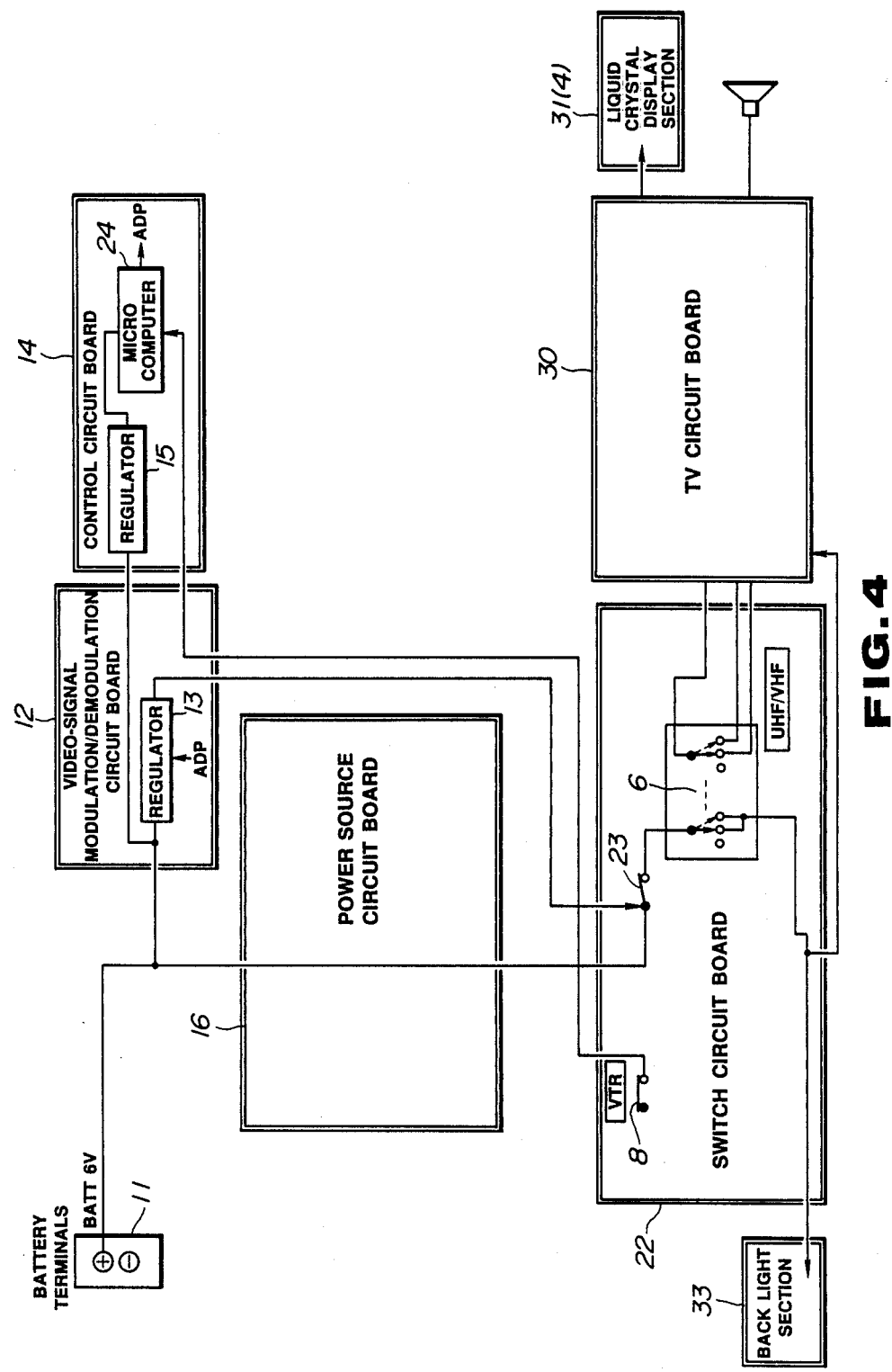
FIG. 4 is a block diagram showing a power source system with a camera switch being turned off, a VTR switch being turned on, and a tuner being selected to operate by a selecting switch.

With the arrangement mentioned above, the monitor display section 4 and EVF 3 are controlled as described in the following Table 1 by manipulating the selecting switch 6, the monitor switch 7, the VTR switch 8 and the camera switch 9.

regardless of manipulation of the selecting switch 6 and the monitor switch 7 as shown in FIG. 3. And the camera control signal CAM supplied from the micro-computer 27 of the system servo-control circuit-board 19 turns on the switch 28, thereby applying power voltage of 5 (V) output by the regulator 17 to EVF 3, so that EVF 3 is caused to turn on.

Furthermore, in case that the camera switch 9 is turned off and the VTR switch is turned on as shown in "II" of Table 1, when the VHF or UHF frequency-band tuner is selected by the selecting switch 6, the monitor switch is caused to turn off regardless of its manipulation. As the VTR switch 8 is on, the microcomputer 24 of the control circuit-board 14 sends the adapter control signal ADP to the regulator 13 of the video-signal modulation/demodulation circuit-board 12. The output voltage of the regulator 13 turns on the switch 23 of the switch circuit-board 22. Accordingly, the power voltage of the battery terminals 11 is applied to the back light section 33 and the TV circuit-board 30 regardless of manipulation of the monitor switch 7, thereby causing the monitor display section 4 to operate. At this time, as the camera switch 9 is off or open, the camera control signal CAM is not transferred from the micro-computer 27 of the system servo-control circuit-board 19 to the switch 28, so that EVF 3 is off.

Figure 5:
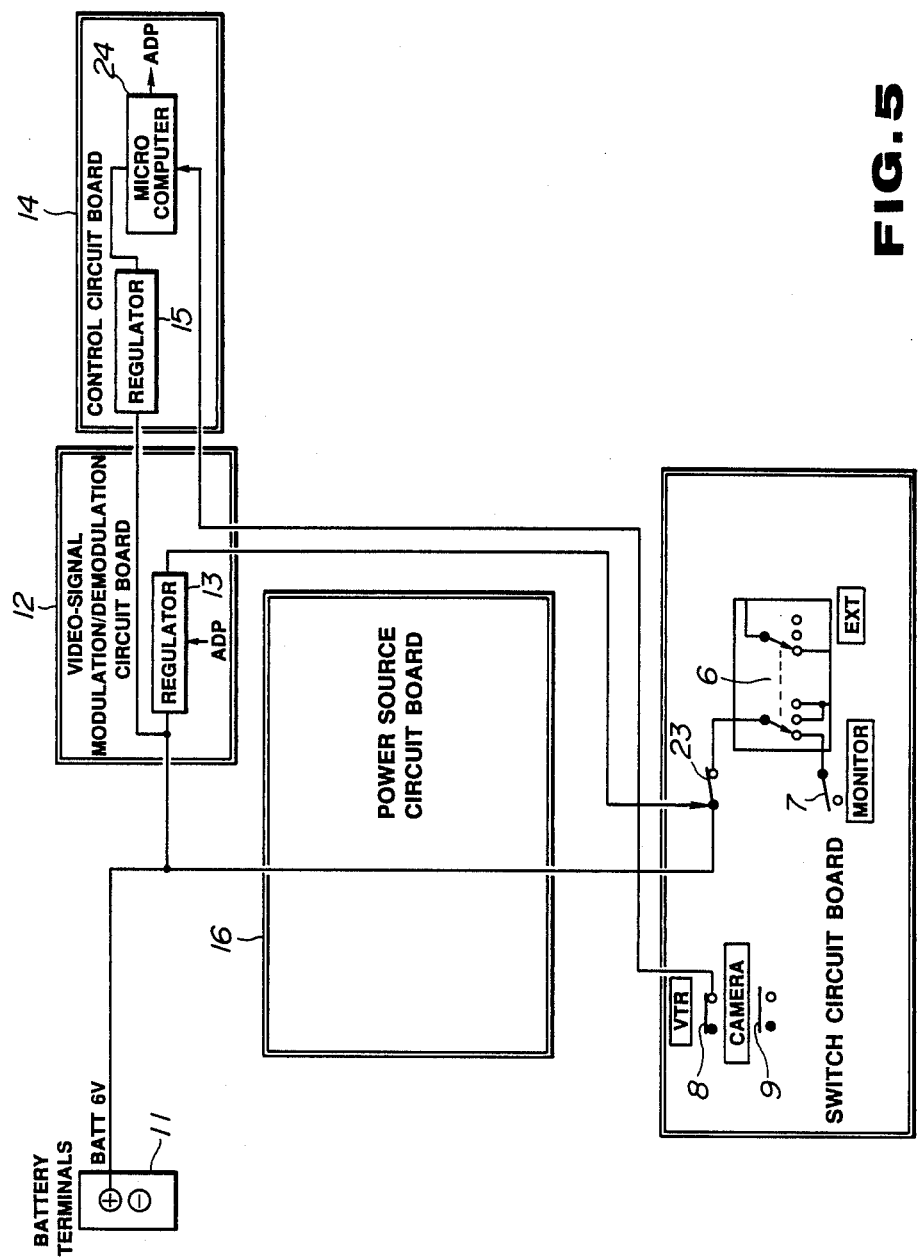
FIG. 5 is a block diagram showing a power source system with a camera switch being turned off, a VTR switch being turned on, an external input being selected by a selecting switch and a monitor switch being turned off.

In the similar manner, in case that the camera switch 9 is off or open and the video switch 8 is on or closed as illustrated in "II" of Table 1, when the external input (EXT) is selected by the selecting switch 6 and the monitor switch 7 is turned off, the microcomputer 24 of the control circuit board 14 transfers the adapter control signal ADP to the regulator 13 of the video-signal modulation/demodulation circuit-board 12 and the switch 23 of the switch circuit-board 22 is caused to turn on by the output voltage of the regulator 13, as shown in FIG. 5. At this time, as the selecting switch 6 stays at the external position (EXT), the power voltage of the battery terminals 11 is supplied to the back light section 33 and the TV circuit board 30 by manipulation of the monitor switch 7, but the monitor switch 7 is off or open so that the monitor display section 33 is turned off. As the camera switch 9 is off or open, the camera-control signal CAM is not transferred from the microcomputer 27 of the system servo-control circuit-board 19 to the switch 28, so that EVF 3 is off.

Still furthermore, in the similar manner mentioned above, in case that the camera switch 9 is off or open and the VTR switch 8 is on or closed, when the external input (EXT) is selected by the selecting switch 6 and the monitor switch 7 is turned on, the microcomputer 24 of the control circuit-board 14 supplies the adapter control signal ADP to the regulator 13 of the video-signal modulation/demodulation circuit-board and the switch 23 of the switch circuit board is turned on by the output voltage of the regulator 13. At this time, as the selecting

TABLE 1

|  | I | II | | | III | | |
|---|---|---|---|---|---|---|---|
| CAMERA POWER SOURCE | ON | OFF | | | ON | | |
| VTR POWER SOURCE | OFF | ON | | | ON | | |
| SELECTING SW | — | TUNER | EXTERNAL | | TUNER | EXTERNAL | |
| MONITOR SW | — | — | ON | OFF | — | ON | OFF |
| MONITOR | OFF | ON | ON | OFF | ON | ON | OFF |
| EVF | ON | | OFF | | | ON | |

Figure 6:
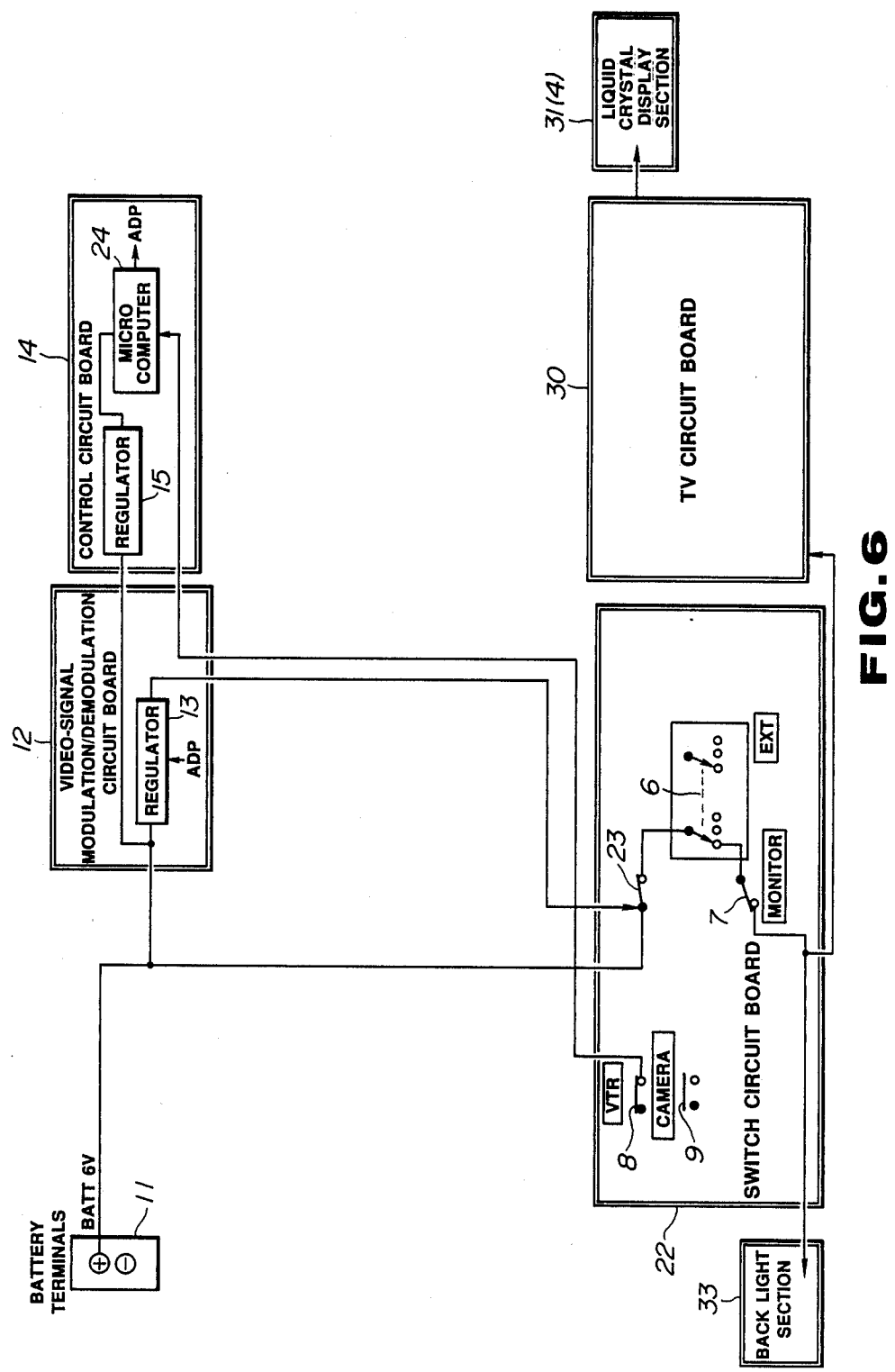

For example, in case that the camera switch 9 is turned on and the VTR switch 8 is turned off as set out in "I" of Table 1, the monitor display 4 is turned off switch 6 stays at the external input (EXT), the power voltage of the battery terminals is supplied to the back light section 33 and the TV circuit board 30 through the closed monitor switch 7, thereby causing the monitor display section 4 to operate, as shown in FIG. 6. As the camera switch 9 is off or open as in FIG. 5, the camera control signal CAM is not transferred from the micro-computer 27 of the system servo-control circuit-board 19 to the switch 28, so that EVF 3 is off.

Figure 7:
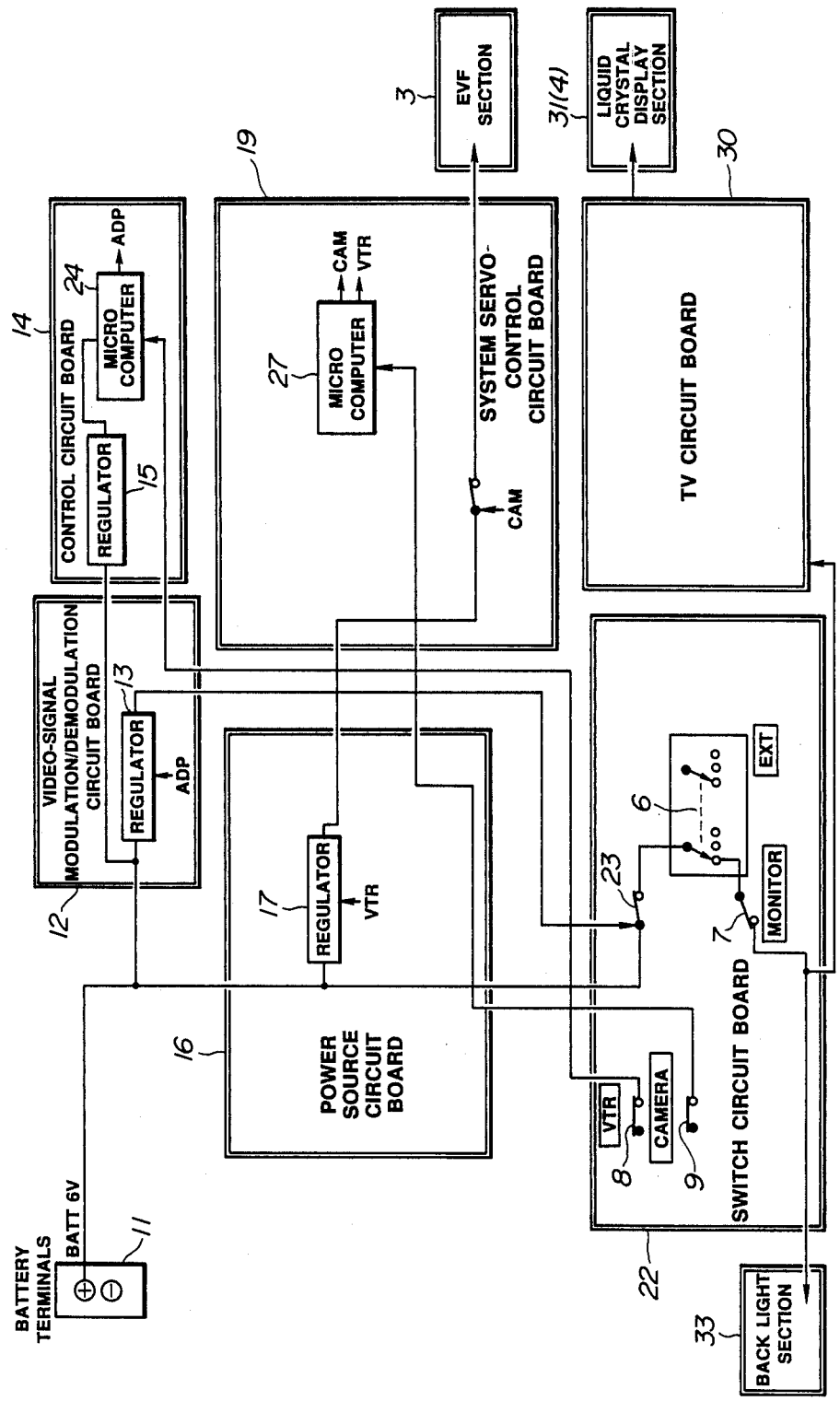

Referring now to FIG. 7, the embodiment with both the camera switch 9 and the VTR switch being on or closed will be described, in which the external input (EXT) is selected by the selecting switch 6 and the monitor switch 7 is on or closed. Since the VTR switch is on or closed, the adapter control signal ADP is transferred from the micro-computer 24 of the control circuit-board 14 to the regulator 13 of the video-signal modulation/demodulation circuit-board 12, and the output voltage of the regulator causes the switch 23 of the switch circuit-board 22 to turn on. At this time, since the selecting switch 6 remains at the external input (EXT), the power voltage of the battery terminals 11 is supplied to the back light section 33 and the TV circuit-board 30 through the closed monitor switch 7, thereby causing the monitor display section 4 to operate. While since the camera switch 9 is on or closed, the micro-computer 27 of the system servo-control circuit-board 19 outputs the camera control signal CAM and the VTR control signal VTR, therefore the regulated voltage of 5 (V) outputted from the regulator 17 is supplied to EVF 3 through the switch 28, thereby causing EVF 3 to operate.

Note that in case both the camera switch 9 and the VTR switch 8 are on or closed, when the tuner is selected by the selecting switch 6 or when the external input (EXT) is selected and the monitor switch is brought off, the monitor display section 4 and EVF 3 are controlled in the same manner as in the case stated in "II" of Table 1 except that EVF 3 is turned on.

Figure 8:
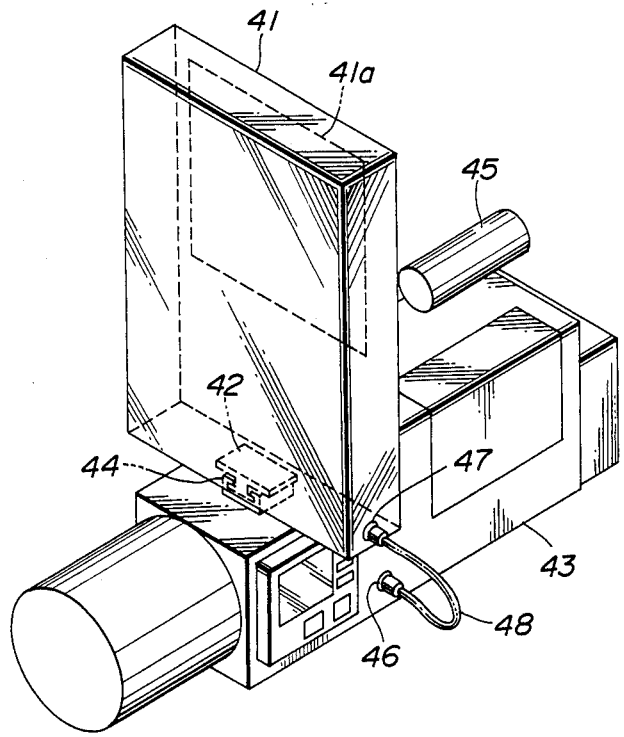
FIG. 8 is an external perspective view of other embodiment of the present invention.

Now, other embodiment of the present invention will be described referring to FIG. 8. In the above mentioned embodiment, the monitor display section is integrally installed to the apparatus body, but in the present embodiment, the monitor display section is separately constructed and detachably mounted on the apparatus body.

A monitor-display device 41 is provided with a shoe-engaging member 42 on a bottom surface of its housing. In the meanwhile, apparatus body 43 is provided with a shoe member 44 on an upper surface of its housing. The monitor-display device 41 is installed on the apparatus body 43 by engaging both the shoe-engaging member 42 and the shoe member 44, with the display screen facing towards a view finder 45. A video-signal output-terminal 46 of the apparatus body 43 and a video-signal input terminal 47 are connected by means of a cable 48, permitting television pictures from the apparatus body 43 to be displayed on the monitor display device 41. Various control signals and the power current are supplied or received throught the cable 48 mentioned above. An independent power source may be installed in the monitor display equipment 41.

With the construction mentioned above, the monitor-display equipment can be dismantled from the apparatus body 43, when unnecessary. If a television receiving circuit is contained in the monitor display equipment 41, the monitor display equipment can be used as a portable television receiver.

What is claimed is:

1. A video camera apparatus having an image pick up equipment with an electronic view finder, a video recording and/or reproducing equipment with a television tuner, and a display equipment, the apparatus comprising:
    a first on-off switch provided on said image pick-up equipment; a second on-off switch provided on said video recording and/or reproducing equipment;
    a third on-off switch provided on said display equipment;
    a selecting switch for selecting a television tuner or an external input;
    means for causing said electronic view, finder to operate and said display equipment to turn off, when said first on-off switch is turned on and said second on-off switch is turned off;
    means for causing said electronic view finder to turn off, when said first on-off switch is turned off and said second on-off switch is turned on and for causing said display equipment to operate, when said television tuner is selected by said selecting switch, and for causing said display equipment to operate or turn off in dependance on a manipulation of said third switch, when said external input is selected by said selecting switch; and
    means for causing said electronic view finder to operate when said first and second on-off switches are turned on, and for causing said display equipment to operate when said television tuner is selected by said selecting switch, and for causing said display equipment to operate or turn off in dependance on a manipulation of said third switch, when said external input is selected by said selecting switch.

2. An apparatus according to claim 1, wherein said display equipment comprises a liquid crystal display equipment.

3. An apparatus according to claim 1, wherein said display equipment is integrally constructed with said video camera apparatus.

4. An apparatus according to claim 1, wherein said display equipment is detachably mounted on said video camera apparatus.

5. An apparatus according to claim 1, further comprising:
    a back light means for lightening said display equipment; and
    means for turning on said back light means of the same time when said display equipment is turned on.

6. An apparatus according to claim 1, further comprising:
    a first micro computer; and
    a second micro computer,
    wherein an output of said first on-off switch is supplied to said first micro-computer while an output of said second on-off switch is supplied to said second micro-computer, and said first micro-computer outputs a signal for causing said image pick-up equipment to operate and a signal for causing mechanisms of said video recording and/or reproducing equipment to work respectively, and said second micro-computer outputs a signal for causing circuits of said video recording and/or reproducing equipment to operate.

7. A video camera apparatus comprising:
    an image pick-up means;
    a view finder means for displaying images picked up by said image pick-up means;

a video recording and/or reproducing means for recording said image picked up by said image pick-up means and for reproducing said recorded image;

display means for displaying said image reproduced by said video recording and/or reproducing means;

a first on-off designating means for designating on and/or off of a power source of said image pick up means;

a first power transmission system which is open or closed by said first on-off designating means;

a second on-off designating means for designating on and/or off of a power source of said video recording and/or reproducing means;

a second power transmission system which is open or closed by said second on-off designating means;

said view finder means being enclosed in said first power transmission system and said display means being enclosed in said second power transmission system.

8. An apparatus according to claim 7, wherein said second power source system further comprises means for selecting on-off conditions of said displaying means.

9. An apparatus according to claim 7, further comprising a video-signal input means enclosed in said second power source system.

10. An apparatus according to claim 9, wherein said video-signal input means comprises a television signal receiving means.

11. An apparatus according to claim 9, wherein said video-signal input means has an input terminal to receive external video signals.

12. An apparatus according to claim 9, wherein said video-signal input means comprises a television signal receiving means, an input terminal for receiving external video signals, and a selecting means for selecting one of said television signal receiving means and said input terminal.

13. An apparatus according to claim 7, wherein said displaying means is fixedly coupled to said image pick-up means.

14. An apparatus according to claim 7, wherein said displaying means is detachably coupled to said image pick-up means.

15. A video camera apparatus having an image pick up equipment with an electronic view finder, a video recording and/or reproducing equipment with a television tuner, and a display equipment, the apparatus comprising:

a first on-off switch;

a second on-off switch;

a third on-off switch;

a selecting switch for selecting a television tuner or an external input;

means for causing said electronic view finder to operate and said display equipment to turn off, when said first on-off switch is turned on and said second on-off switch is turned off;

means for causing said electronic view finder to turn off, when said first on-off switch is turned off and said second on-off switch is turned on and for causing said display equipment to operate, when said television tuner is selected by said selecting switch, and for causing said display equipment to operate or turn off in dependance on a manipulation of said third switch, when said external input is selected by said selecting switch; and means for causing said electronic view finder to operate when said first and second on-off switches are turned on, and for causing said display equipment to operate when said television tuner is selected by said selecting switch, and for causing said display equipment to operate or turn off in dependance on a manipulation of said third switch, when said external input is selected by said selecting switch.

* * * * *